United States Patent [19]

Yetter

[11] Patent Number: 4,656,067

[45] Date of Patent: Apr. 7, 1987

[54] FLUSH TRAY MANUFACTURED BY ROTATIONAL MOLDING

[76] Inventor: Lloyd E. Yetter, P.O. Box 97, Colchester, Ill. 62326

[21] Appl. No.: 625,785

[22] Filed: Jun. 26, 1984

[51] Int. Cl.$^4$ .......................... B28B 1/02; B32B 3/30
[52] U.S. Cl. ....................................... 428/35; 119/20; 119/28; 264/310; 428/131; 428/167
[58] Field of Search ................. 428/35, 167, 131; 264/310, 311; 119/20, 28

[56] References Cited

U.S. PATENT DOCUMENTS

| 160,272 | 9/1950 | Reynolds | 206/561 |
| 360,452 | 4/1887 | Lansing | 119/28 |
| 756,716 | 6/1902 | Schmidt | 119/28 |
| 998,490 | 7/1911 | Pitoh | 220/70 |
| 3,119,373 | 1/1964 | Schmid | 119/28 |
| 3,228,375 | 1/1966 | Philippe | 119/28 |
| 3,561,375 | 9/1970 | Hammond | 108/53 |
| 3,695,911 | 12/1967 | Polin | 117/34 |
| 3,704,084 | 10/1972 | Clay | 425/404 |
| 3,829,272 | 8/1974 | Carillion et al. | 425/430 |
| 3,839,533 | 10/1974 | Laing | 264/310 |
| 4,146,565 | 3/1979 | Quraishi | 264/310 |
| 4,158,686 | 6/1979 | Boeckmann | 264/310 |
| 4,285,903 | 8/1981 | Lemelson | 264/40.1 |
| 4,348,986 | 9/1982 | Marrs | 119/20 |

OTHER PUBLICATIONS

Lage Gravity Flush Pans, advertisement, Lage Products, Montezuma, Iowa.
Big John Waste Removal System, advertisement, Syndicate Sales, Kokomo, IN.

*Primary Examiner*—Paul J. Thibodeau
*Attorney, Agent, or Firm*—Lowe, Price, LeBlanc, Becker & Shur

[57] ABSTRACT

The invention relates to a rotationally molded plastic flush tray having a drain opening and a plurality of ribs or rib portions projecting upwardly from the horizontal interior portion of the tray for channeling flushing fluids to the drain opening. The ribs or rib portions include openings for permitting the plastic material to flow during molding and to provide uniform plastic thickness prior to solidification of the plastic.

31 Claims, 4 Drawing Figures

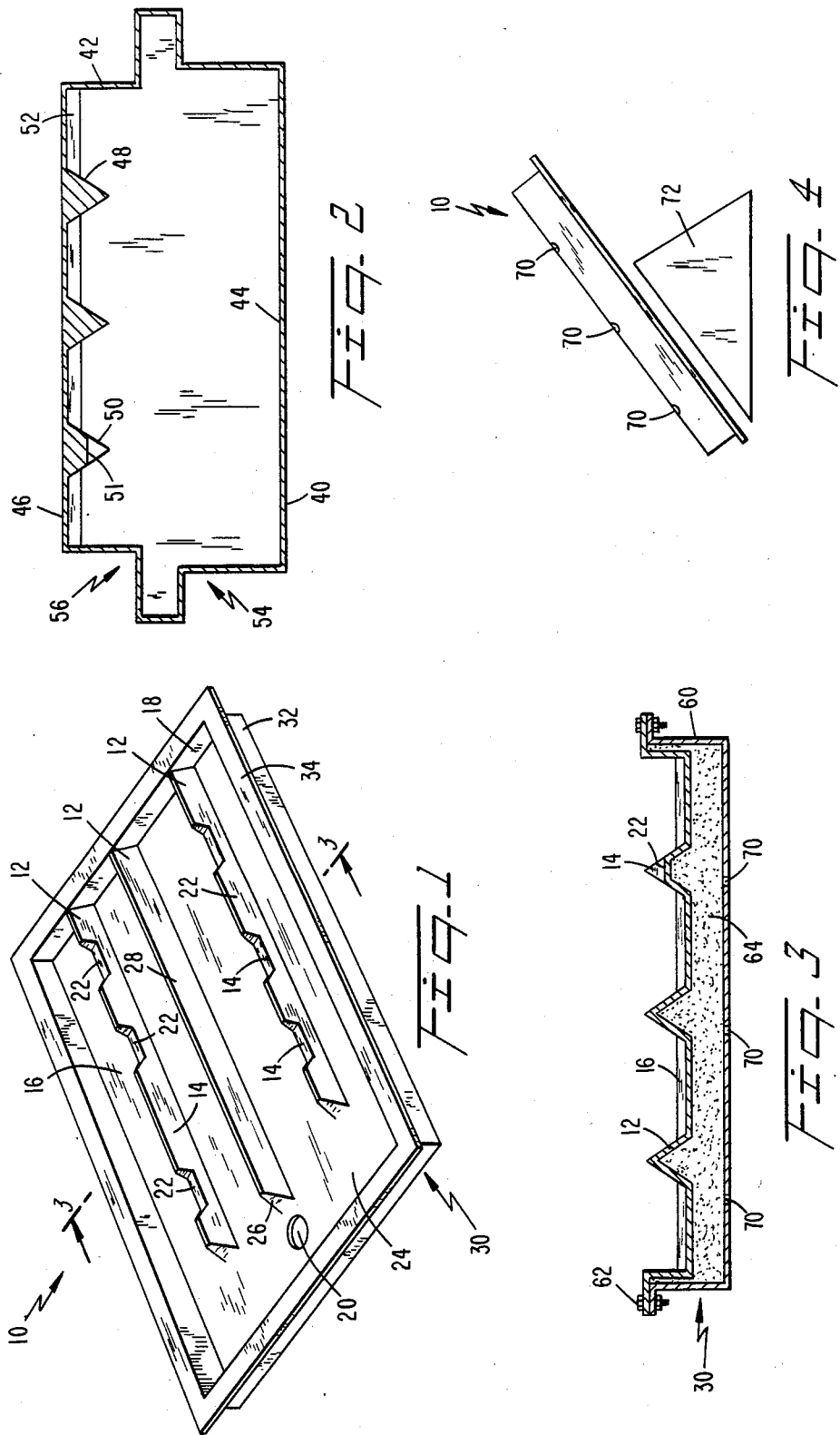

FLUSH TRAY MANUFACTURED BY ROTATIONAL MOLDING

TECHNICAL FIELD

This invention relates to large plastic trays, and specifically to improvements in such articles manufactured by a rotational molding process.

BACKGROUND ART

In the field of animal husbandry, it has been recognized that farrowing stalls and nursery pens, as illustrated in U.S. Pat. No. 4,348,986, reduce labor costs and increase livestock production. Such farrowing stalls and nursery pens typically include a raised, heavy gauge, wire mesh flooring supporting the associated stall or pen. These structures, however, lead to waste disposal problems. Accordingly, there have been developed in the prior art flush trays for use in conjunction with such farrowing stalls and nursery pens and in conjunction with other animal husbandry applications. Such trays, because of the applications to which they are put, preferably include projecting supporting ribs formed as a portion thereof.

However, the prior trays suffer from disadvantages resulting from the method of manufacture of the same. For example, where a prior art flush tray is manufactured by a vacuum molding process, the product is subject to stress cracks and breakage.

One significant reason for such difficulties in the prior art is a difficulty in controlling the thickness of articles formed by the vacuum molding process. Rotational molding provides improvements in the properties both of the plastic used and of the resulting product, and results in stress-free articles having predictable wall thickness and in substantial elimination of waste of raw material. However, a disadvantage of such a procedure exists with respect to large articles of manufacture.

As has been described in U.S. Pat. No. 4,285,903, the rotational molding process provides a predetermined quantity of resinous material to a mold which is then rotated to distribute the material for solidification along the surface of the mold. However, for large articles there arises a problem in view of the use of quick setting resins. Particularly, as disclosed therein, the resin beings to set prior to reaching all portions of the mold, so that a nonuniform, lumpy, or otherwise uneven structure results. The U.S. Pat. No. 4,285,903 recognizes the problem and provides a complex, closed loop, programmed control apparatus in a solution which introduces the molding material to the mold at a plurality of locations. Thus, the disclosed control apparatus is intended to distribute the molding material throughout the mold before the material has set, or begun to set, to shape.

Another patent disclosure recognizes the problem of providing uniform wall thickness for rotationally molded products. U.S. Pat. No. 4,146,565 discloses a progressively decreasing rate of motion for the mold, in accordance with the increase of viscosity of material being molded, in order to provide the desired uniform wall thickness. However, similarly to the U.S. Pat. No. 4,285,903 disclosure, the suggested solution of U.S. Pat. No. 4,146,565 requires complex and expensive redesign, specifically of specialized molding equipment.

U.S. Pat. No. 4,158,686 teaches the use of a rotational molding apparatus for formation of an article having stemlike projections F jutting out therefrom. However, no recognition is found therein of any difficulties caused by the projections or the rotational molding process.

Accordingly, there is a need in the prior art for method or apparatus for providing large scale articles of manufacture which are substantially stress- or crack-free, specifically for formation of such articles by a rotational molding process. However, there is also a need for provision of substantially uniform wall thickness for large scale products such as flush trays, and particularly for such products having ribs projecting therefrom.

DISCLOSURE OF INVENTION

In view of the foregoing difficulties in the prior art, it is a primary object of the present invention to provide a large article of manufacutre, produced by a rotary molding process, and having a uniform thickness due to uniform distribution of plastic resinous material during the manufacturing process.

It is another object of the invention to form a large plastic tray by a rotational molding process with uniform thickness.

A further object of the invention is the provision of uniform wall thickness for large plastic flush trays having internal ribs, wherein the tray is produced by a rotational molding process.

Still a more specific object of the invention is the provision of openings in rib portions of a mold used to make a flush tray for providing a uniform distribution of resinous molding material and a uniform wall thickness for the product manufactured thereby.

It is still another object of the invention to provide dams in a number of openings provided in rib portions of a flush tray to prevent flushing fluid from transferring between adjacent inter-rib portions of the tray.

It is another object of the invention to provide extensions of ribs into a non-ribbed area to direct plastic towards a drain of the tray during formation of the flush tray.

It is an additional object of the invention to provide a large ribbed flush tray for farrowing stalls, nursery pens, and the like including therein structure for attachment to a flooring thereabove.

Still another object of the invention is the provision of a flush tray which may be formed of either a single walled or a doubled walled structure, wherein a single walled structure is nestably provided on a frame having members nesting within grooves on the underside of the structure corresponding to ribs formed on the upper side thereof.

Yet another object of the invention is the provision of a double walled flush tray structure, having insulating and supporting material between the walls.

Additional objects, advantages and other novel features of the invention will be set forth in part in the description which follows and in part will become apparent to those skilled in the art upon examination of the following, or may be learned with the practice of the invention. The objects and advantages may be realized and attained by means of the instrumentalities and combinations particularly pointed out in the appended claims.

To achieve the foregoing and other objects, and in accordance with the purposes of the present invention as described herein, an improved apparatus and method are provided for forming large articles of manufacture, particularly flush trays. A flush tray formed according to the invention includes a substantially horizontal interior portion having a drain and a number of upwardly projecting ribs for channeling flushing fluids to the drain. The interior is downwardly sloped towards the drain. The tray is a large article of manufacture formed from a resinous material by a rotational molding process. A uniform plastic thickness is provided to the tray, the uniform thickness being formed during the rotational molding process by providing a uniform distribution of plastic throughout the mold.

Preferably, the ribs of the tray include openings which are formed by openings provided in the mold for permitting flow of the plastic molding material therethrough during the rotational molding process, thereby to provide the uniform distribution of plastic throughout the mold. Such a uniform distribution in turn provides uniform plastic thickness prior to solidification of the plastic molding material.

The openings may include dams for preventing passage of a flushing fluid therethrough during use of the large tray. Moreover, the interior protion of the tray may include a rib free area in the vicinity of the drain hole, the ribs having extensions (formed by extensions in the mold) which project to the rib-free region for deflecting the molten plastic during the rotational molding process into channels formed between the ribs. The extensions and the rib openings, either individually or in a cooperative combination, thus provide the uniform plastic thickness for the manufactured article. Moreover, the rib-free region may extend transveresly to the direction of the ribs and may be transversely downwardly sloped towards the drain.

Structurally, the tray may be rectangular and the drain may be located centrally along one edge of the rectangle. Additionally, a peripheral flange-like support structure may surround the interior portion of the tray. The flange is provided for supporting a horizontal surface thereabove, and may include substantially vertical wall portions having an outwardly projecting horizontal shoulder.

In accordance with another aspect of the invention, there is provided a double walled, plastic flush tray having an inner structure and an outer structure spaced apart from and attached to the inner structure, the inner structure forming an interior portion of the tray having a drain opening and a plurality of ribs projecting upwardly therefrom. The interior portion is downwardly sloped towards the drain opening and is surrounded by a peripheral flange having vertical wall portions for supporting a horizontal surface thereabove, on a horizontal shoulder structure provided therefor.

The tray may include a number of openings in its outer section for injection of insulating and support material into the space between the inner and outer structures. The insulating and support material may be a urethane plastic.

The ribs provided in the interior portion of the tray preferably include openings for permitting flow of plastic material therethrough during a rotational molding process for forming the same. Moreover, the openings may have dams for preventing passage of a flushing liquid therethrough between adjacent inter-rib regions. Advantageously, in view of the rotational molding process and the resultant stress-free product, the inner and outer structures may be bolted together along the horizontal shoulder portions thereof.

In accordance with still a further aspect of the invention there is provided a method for forming a large ribbed structure to a uniform thickness. The inventive method provides a rotational molding process in which a charge of a plastic resin is provided to a mold, the mold thereafter being rotated for distribution of the plastic resin to the surface thereof. Significantly, the inventive method includes a step of distributing the resin to the various areas of the structure through openings provided in a ribbed portion of the mold. The step of distributing the resin may further include a step of channeling the resin to areas between adjacent ribs by extensions of rib portions of the mold.

Still another objects and features of the present invention will become readily apparent to those skilled in the art from the following description wherein there is shown and described a preferred embodiment of the invention, simply by way of illustration of one of the best modes suited to carry out the same. As will be realized, the invention is capable of still other, different, embodiments, and its several details are capable of modification in various obvious aspects, all without departing from the invention. Accordingly, the drawing and the description will be regarded as illustrative in nature and not as restrictive of the invention.

DESCRIPTION OF THE DRAWINGS

FIG. 1 shows a perspective view of a tray in accordance with the invention;

FIG. 2 shows a mold which may be used to form the inventive tray in a rotational molding process;

FIG. 3 shows a cross sectional view of a tray according to the invention taken along lines 3—3 in FIG. 1; and FIG. 4 shows an arrangement for injection of insulating and support material into the inventive structure.

BEST MODE FOR CARRYING OUT THE INVENTION

Referring now to the drawing illustrating a preferred embodiment of the invention, there is generally shown at 10 a large flush tray which may be used in conjunction with farrowing pens or the like.

Advantageously, and in accordance with the aims and objects of the invention, the tray is formed by a rotational molding process and is possessed of a substantially uniform cross section of plastic. A uniform, thick, cross section is a highly desirable feature of such large articles of manufacture which are subject to significant stress in use. Further, in view of the contemplated uses of the inventive structure, it is desirable to use a type of polyethelene plastic which is pliable and thus less likely to develop stress cracks when subject to heavy loads, as are likely to occur when a heavy flooring is placed thereover and when livestock is kept on the flooring. Such cracks, which are likely to appear due to damage in shipping and, in use, due to continuous movement of animals on the tray floor, may lead to failure of the tray and to expensive, premature replacement.

Additionally, for a tray to be used in waste disposal, it is preferable for health and cosmetic reasons that waste material will not adhere to the tray.

Thus, a pliable and non-porous material is preferred for use in fabricating the tray to be non-corrosive to metallic support structure, to provide control of bacterial growth, to reduce odors, and to support heavy loads without developing stress cracks.

One type of plastic meeting these desiderata may be formed of a medium density resin marketed by The Union Carbide Corporation under the designation DNDC-7148 Natural 7. This resin, however, is designed for use in a rotational molding process for forming various articles of manufacture.

As is apparent from the drawing, the tray in accordance with the invention is provided with a number of ribs 12 to add strength and rigidity to its structure and to support a flooring which is to rest thereon. As is seen in FIG. 1, the ribs define a longitudinal direction of the tray. Rotational molding of large ribbed structures of this type, however, typically results in uneven distribution of the resin charge and an uneven coating thickness. Accordingly, prior art flush trays are typically formed in a vacuum molding process, which cannot provide the desired thickness of plastic material for the contemplated use, and are subject to other deficiencies thereof.

In accordance with the present invention, however, the large, ribbed, tray shown in FIG. 1 is produced by the desirable rotational molding process and is provided with a uniform thickness of non-porous, pliable, plastic. Additionally, the tray is structured for a simplified waste disposal procedure and to assure that a number of such trays may be placed adjacent each other, and further to assure that waste will not drop through the flooring to gather at the bottom support floor near the edges of the tray.

A significant feature of the invention permitting fabrication of the tray by the rotational molding process is found in a number of gates, or openings, 14 provided in the longitudinal ribs. These gates permit flow of molten plastic material across the mold, transversely to and through the several ribs during the molding process. Without such gates, the central area of a tray formed by a rotational molding process is likely to include a number of holes, or areas of thin plastic, severely reducing the structural strength of the article.

In view of the gates provided in the ribs, the large, ribbed tray shown in FIG. 1 may be manufactured by a rotational molding and is provided with a substantially uniform plastic thickness on its ribs as well as on a bottom surface portion 16 thereof. The resulting tray is thus free of the structural defects which otherwise plague such devices when fabricated by the rotational process.

In order to enhance the operation of the tray for its intended purpose, specifically when used in farrowing pens, the bottom surface 16 is preferably downwardly sloped, longitudinally, from one end 18 thereof to an opposing end of the substantially rectangular structure. Further, a drain opening 20 is provided at the opposing end for discharge of the waste collected in the tray.

As will be described in the sequel, the slope of the bottom surface may be provided in two ways. Where the tray is formed as a single walled structure, one end thereof may be supported at a height above that of the other end. Where a double walled structure is used, explained in connection with FIG. 3, an interior walled portion may be provided at different heights above an exterior walled portion of the tray.

Connected to the drain opening 20 is a threaded fitting (not shown), which may be three inches in diameter, for connecting to a pipe system used to flush waste matter from the tray. Particularly, trays in accordance with the invention may be used in groups, each tray holding water to a particular depth to dilute wastes and to reduce formation of topic gases. Each tray is provided with its own waste disposal outlet.

The outlets of a number of trays are valvedly connected to a main disposal pipe. Each drain outlet may have its own control valve, which may be a simple gate valve. However, the main disposal pipe may have a central control valve operable instead of, or in conjunction with, the individual valves. Periodically, the valve in the main disposal pipe is (or the individual valves are) opened to permit any fluids in the tray (or trays) to flush the waste material under gravitational force.

In view of the material of the tray and the method of formation thereof, any type of attachment may be used to attach the outlet and plumbing connection to the tray. For example, the outlet which is preferably threaded as above mentioned, may be molded to the plastic. Alternatively, the outlet may be welded or bolted to the plastic of the tray. Each of these techniques may be used since the flexibility of the plastic utilized in the rotational molding process assures that the tray will not crack due to stress of connection of the outlet thereto.

In order to enhance operation of the inventive tray, dams 22 are provided ing ates 14. These dams are provided in order to prevent passage of the flushing liquid from a channel between two ribs to another channel, between two other ribs. That is, the dams help channel the flushing fluid along the inter-rib portions of the tray from the one end 18 thereof towards the drain 20, thereby providing more efficient flushing and drainage of waste under either a gravitational or a forced, flushing system.

Additionally, at the end of the tray in which the drain 20 is situated there is provided a rib-free area 24. This area permits the waste flushed from all the channels to flow, unimpeded, towards the drain opening 20. The rib-free area, moreover, is transversely sloped from the two sides of the tray towards the drain 20, which is preferably centrally located along the edge of the tray. Thus, the waste flushed from the tray is first channeled longitudinally and then transversely by an appropriate sloping arrangement provided in the tray of the invention.

Yet another feature of the invention is seen in an extension 26 provided in the rib-free area 24 for rib 28. Such an extension is useful, along with or separately from gates 14, to direct the plastic material towards the central areas of the tray during the rotational molding process.

More specifically, during the rotational molding of the tray extension 26 may trap portions of the plastic material flowing across the rib-free end of the mold used to make the tray. The extension is particularly useful in redirecting the plastic fluid toward the channels between the various ribs, thus further assuring the desired uniform thickness of the final product.

Although a single rib extension is shown in FIG. 1, it should be noted that the above described effect may be achieved by providing different lengths to the various ribs and particularly by providing a number of ribs having a longer longitudinal dimension than other ribs.

Still another aspect of the invention relates to support provided by the tray for the flooring to be placed thereabove. In view of the specific materials and process of manufacture used in accordance with the invention, the present tray may support the flooring by the very ribs used therein to channel the waste fluid towards the drain. Additionally, a supporting flange structure is provided peripherally of the tray for attachment to and support of the flooring.

As is seen in FIG. 1, the central rib 28 is provided without any gates. This rib is thus more rigid than the other ribs, and may thus provide support for the flooring and livestock. Additionally, although not necessarily designed for support, the remaininng ribs may similarly provide support, if designed to project upwardly to the same extent as rib 12. It should be recognized that although three ribs are shown in the drawing, and although only one rib is shown as a support member, it is possible to provide additional ribs and additional support members.

In the preferred embodiment of the invention there are in fact provided five ribs and a central supporting rib. For ease of illustration, however, only three ribs are shown in FIG. 1. In this embodiment, all ribs project upwardly to the same extent as the central rib, and thus some measure of support is provided by each of the ribs.

In addition to the supporting rib or ribs, the tray of FIG. 1 further provides support for the flooring by a peripheral flanged structure, shown at 30. The flanged structure includes a substantially vertical member 32, extending upwardly about the periphery of the tray, and a horizontal shoulder 34 projecting outwardly therefrom.

The shoulder portion 34 performs two functions in the present structure. A flange is provided thereby for attaching to the mesh flooring above the tray, to the farrowing stalls, or to the nursery decks. Thus, the flooring, decking or the like is prevented from moving or sliding on the tray. Attachment to the tray may be had by a number of bolts, for example. Such an attachment cannot be provided with prior devices in view of the sensitivity of the plastic used therein to stress and its potential for cracking in response to application of the attaching bolts.

Another advantage provided in the present invention is the enhanced rigidity of the tray sides and the ability to maintain the sides of the tray aligned and straight. The sides, such as the vertical member 32, are thus prevented from bowing inwardly and permitting the waste to fall between the trays when set in a row. By providing the horizontal shoulder 34 atop the vertical member 32, the present invention requires substantial force to be applied in order to bend, or bow, the vertical member, since any such bowing requires the horizontal shoulder to be simultaneously deformed in the plane of the material.

Thus, in addition to the enhanced rigidity offered by the material and process used to form the invention, the horizontal shoulder further enhances the rigidity of the tray sides.

Referring now to FIG. 2, there is shown in cross section a mold structure which may be used to form the tray of the present invention. Alternatively, since the shape of the mold corresponds to the shape of the product molded thereby, the Figure may be considered to illustrate a cross section of the product of a rotational molding process in accordance with the invention.

As is seen therein, a mold for the present invention is provided with a first portion 40 and a second portion 42. The first portion includes a substantially flat bottom part 44, while the second portion includes a sloped portion 46 having ribs 48 projecting therefrom. The ribs 48 provided in the mold, as is known in the molding art, are coated by the plastic resin during the rotational molding prcoess. As a result, the ribs 12 of the tray are formed.

Thus, in order to provide the rib-free area 24, there is provided in the mold structure a corresponding rib-free area (not shown). Moreover, at various locations along the ribs in the mold, there are provided openings as illustrated by the opening 50. The openings may include dams 51 therein to form the dams 22 for the tray structure of FIG. 1. The sloping portion of the bottom surface 16 of the tray structure is formed by a slope in portion 46, as shown in FIG. 2 at 52.

The mold of FIG. 2 forms, in one process, two portions which may be combined to form a double-walled embodiment of the tray structure of FIG. 1. Particularly, first portion 40 of the mold forms an outer portion of the tray and second portion 42 forms an inner portion of the tray. As is apparent from FIG. 2, both the first and second portions of the mold are provided with peripheral flange molding structures 54 and 56 having vertical and horizontal sections.

To provide an appropriate mating fit, the vertical dimension of the vertical section of peripheral flange structure 54 is somewhat larger than the corresponding dimension for the vertical section of flange structure 56. Similarly, the horizontal dimension of the shoulder of flange structure 54 is somewhat smaller than the corresponding dimension for flange structure 56. Thus, after separation of the inner and outer portions of the molded product from one another, the inner portion of the tray, formed by portion 42 of the mold, fits within the outer portion of the tray, formed by portion 40 of the tray. The combined portions form a double walled tray structure, having improved structural rigidity over that of a single walled tray, which may be formed by only the second portion 42 of the mold.

Referring now to FIG. 3, the separated and recombined portions forming the double-walled tray are shown in cross section. Therein, the inner portion including the sloped bottom surface 16, ribs 12, gate 14 and dam 22 is mounted within, and spaced apart from, outer portion 60. The two portions may be attached to one another by a plurality of fasteners, such as bolt-and-nut arrangements 62, provided along the horizontal shoulders of the portions. Similar fastening structures may be used to attach the tray to the overlying flooring, as previously described.

The ouer portion 60 provides a substantially flat bottom for the tray which, notwithstanding the sloping surface 16 provided for flow of flushing liquid, does not require special supporting framework and permits setting the tray on existing floor systems. Thus, the double-walled embodiment does not require special floor systems and may be used with existing systems, where the only support provided for the tray is horizontal or parallel to the ground. Alternatively, for a single walled structure, in which the outer portion 60 is not utilized, a sloping steel framework (not shown) may be used to provide the advantageous slope to the bottom surface of the tray. Such a framework may incorporate adjustable leg supports to permit the tray to be set on uneven floors. Advantageously, the undersides of the ribs provided in the tray may be used to receive support members of the framework.

In view of the improved process and materials used in forming the tray, the support framework may be attached to the tray by means of bolts, as previously described for the overlying flooring.

As is illustrated in FIG. 3, the space between the inner and outer portions of the double-walled embodiment may be filled with a foam 64, as for example a urethane foam. The foam provides added strength and rigidity to the structure. Additionally, the foam acts as an insulation barrier, thus maintaining a warmer environment for the livestock thereabove.

At FIG. 4 is shown an arrangement usable to inject the foam into the space between the outer and inner portions of the tray. More specifically, the combined structure may be provided with a plurality of openings 70 at the bottom of the outer portion, the openings to be used as fill holes during a foam injection procedure.

A frame 72, or other apparatus, may be used to incline the tray at a desired angle to the horizontal. The foam may be injected into the space between the portions of the tray beginning at the lowest holes in the arrangement of FIG. 4. The injected foam gradually solidifies as it progresses downwardly under gravitational influence. Thus, by selecting an appropriate rate of injection and by choosing a proper angle of inclination of frame 72 and spacing for the fill holes 70, an appropriate quanitity of foam will solidify between the portions of the tray at an appropriate density.

There has thus been shown a tray, together with a process for manufacture thereof, having improved qualities. The tray according to the invention is structured to permit fabrication by a rotational molding process and to provide a substantially uniform thickness of plastic throughout. A number of gates are provided for that purpose in ribs provided in the tray. The gates are dammed to direct flushing fluid appropriately through the channels formed between ribs provided in the tray. Some of the ribs are formed with extensions into a rib-free area in order further to faciliatate a uniform distribution of plastic in the structure.

The tray is further provided with a peripheral flange structure to enhance the rigidity and strength thereof, and is filled with foam to provide both added support strength and insulation.

While a preferred embodiment of the invention has been described, the same is illustrative only and not limitative of the invention which is defined in the appended claims. It will be appreciated that numerous modifications thereof will occur to those skilled in the art to which the invention pertains. All such modifications and other equivalents are within the spirit and scope of the invention as defined by the claims.

I claim:

1. A plastic flush tray having a substantially horizontal interior portion, said interior portion having:
   a drain opening;
   a plurality of ribs projecting upwardly from the horizontal interior portion for channeling flushing fluids to said drain opening; and
   said interior portion being sloped downwardly towards said drain opening further to channel the fluids to the opening;
   wherein said tray is a large article of manufacture, formed from a plastic material by a rotational molding process utilizing a mold,
   said tray having a substantially uniform plastic thickness formed during said rotational molding process by providing a uniform distribution of plastic throughout the mold,
   said ribs including openings formed by openings in said mold for permitting said plastic material to flow therethrough during said rotational molding process, thereby to provide said uniform distribution of plastic throughout the mold and to provide said uniform plastic thickness prior to solidification of the plastic.

2. A flush tray as recited in claim 2 wherein said ribs include dams in said openings for preventing passage of a flushing liquid through openings between different inter-rib regions.

3. A flush tray as recited in claim 1 wherein said interior portion is surrounded by a peripheral flange structure for supporting a horizontal surface thereabove, the flange structure including substantially vertically extending wall portions having a substantially horizontal shoulder structure projecting outwardly therefrom.

4. A flush tray as recited in claim 1 wherein said tray comprises a single walled structure and includes means for receiving supporting structure provided on a separate framework for supporting said tray above a ground level.

5. A plastic flush tray having a substantially horizontal interior portion, said interior portion having:
   a drain opening;
   a plurality of rib portions projecting upwardly from the horizontal interior portion for channeling flushing fluids to said drain opening; and
   wherein said tray is a large article of manufacture, formed from a plastic material by a rotational molding process utilizing a mold,
   said tray having a substantially uniform plastic thickness formed during said rotational molding process by providing a uniform distribution of plastic throughout the mold,
   said rib portions spaced apart by openings for permitting said plastic material to flow therethrough during said rotational molding process, thereby to provide said uniform distribution of plastic throughout the mold and to provide said uniform plastic thickness prior to solidification of the plastic, wherein said openings include a rib-free region in said interior portion of the tray in the vicinity of said drain opening.

6. A flush tray as recited in claim 5 wherein said mold includes a plurality of ribs and a rib free region, and said rib portions of said flush tray include extension portions, formed by extensions of said ribs in said mold projecting ins aid rib-free region for deflecting molten plastic during said rotational molding process to channels formed between said rib portions, thereby to provide said uniform plastic thickness.

7. A flush tray as recited in claim 6 wherein said rib portions include openings formed by openings in said ribs in said mold for permitting plastic material to flow therethrough during said rotational molding process, thereby to provide said uniform distribution of plastic throughout the mold and to provide said uniform plastic thickness prior to solidification of the plastic.

8. A flush tray as recited in claim 5 wherein said rib portions define a longitudinal direction and said rib-free region extends in the transverse direction thereto and is transversely sloped downwardly towards said drain opening.

9. A flush tray as recited in claim 8 wherein said interior portion is sloped downwardly towards said drain opening further to channel the fluids to the opening.

10. A flush tray as recited in claim 9 wherein said tray is substantially rectangular in shape and said drain opening is located substantially along one edge of said rectangle, said rib portions extending along at least a portion of the longitudinal direction between said one end of said rectangle and the opposite edge thereof, and wherein said downward slope of said interior portion is in said longitudinal direction.

11. A flush tray as recited in claim 10 wherein said drain opening is located substantially centrally along said one edge of said rectangle, said rib-free region including downward slopes toward said drain opening from opposing sides of the tray.

12. A flush tray as recited in claim 5 wherein said rib portions define a longitudinal direction and said rib-free region extends in the transverse direction thereto.

13. A flush tray as recited in claim 12 wherein said transverse rib-free region is connected to an outlet forming said drain opening.

14. A plastic flush tray having a substantially horizontal interior portion, said interior portion having:
a drain opening;
a plurality of ribs projecting upwardly from the horizontal interior portion for channeling flushing fluids to said drain opening; and
wherein said tray is a large article of manufacture, formed from a plastic material by a rotational molding process utilizing a mold,
said tray having a substantially uniform plastic thickness formed during said rotational molding process by providing a uniform distribution of plastic throughout the mold,
wherein said tray is formed as a double-walled structure having an innter structure forming said interior portion and an outer structure spaced apart from and attached to said inner structure,
said ribs including portions separated by openings formed by openings in said mold for permitting said plastic material to flow therethrough during said rotational molding process, thereby to provide said uniform distribution of plastic throughout the mold and to provide said uniform plastic thickness prior to solidification of the plastic.

15. A tray having a substantially horizontal interior portion, said interior portion having:
a drain opening,
a plurality of rib portions projecting upwardly from the horizontal interior portion for channeling flushing fluids to said drain opening,
said interior portion surrounded by a peripheral flange structure for supporting a horizontal surface thereabove, the flange structure including substantially vertically extending wall portions having a substantially horizontal shoulder structure projecting outwardly therefrom,
said tray formed as a double-walled structure having an inner structure forming said interior portion and an outer structure spaced apart from and attached to said inner structure,
said rib portions spaced apart from each other for permitting plastic material to flow therebetween during a rotational molding process therefor.

16. A tray as recited in claim 15 further including means for injecting insulating and support material into the space between said inner and outer structures.

17. A tray as recited in claim 16 wherein said means for injecting comprises a plurality of openings provided in said outer structure.

18. A tray as recited in claim 17 wherein said insulating and support material comprises a urethane foam and wherein said tray is formed of nonporous material.

19. A tray as recited in claim 15 wherein said rib portions are spaced apart by openings in said rib portions for permitting plastic material to flow therethrough during the rotational molding process therefor.

20. A tray as recited in claim 19 wherein said rib portions include dams in said openings for preventing passage of a flushing liquid through said openings between different inter-rib regions.

21. A tray as recited in claim 20 further comprising attaching means for attaching said inner and outer structures to one another, said attaching means comprising a plurality of fasteners provided along said horizontal shoulder structure of said peripheral flange structure.

22. A flush tray as recited in claim 15 wherein said interior portion includes a bottom part sloped downwardly towards said drain opening further to channel the fluids to said opening.

23. A tray as recited in claim 22 wherein said bottom part of said interior portion includes a sloping floor portion between said vertically extending wall protions, said floor portion of said interior portion being supported at different heights above a bottom portion of said outer structure.

24. A tray as recited in claim 22 wherein said sloping bottom part of said interior portion is provided by a support for one end of said tray at a higher level than support for the opposing end thereof.

25. A method for forming a large ribbed structure having a drain opening in a horizontal interior portion thereof, said interior portion being sloped downwardly towards said drain opening to channel flushing fluids to said drain opening, a plurality of rib portions projecting upwardly for channeling said flushing fluids to said drain opening, said method providing for a uniform thickness and comprising the steps of:
providing a charge of a plastic material to a mold having rib portions;
providing openings among said rib portions of said mold for forming corresponding openings among said rib portions of said large ribbed structure;
rotating said mold to distribute the plastic material to the surface of the mold; and
distributing the plastic material to various areas of the structure through said openings provided among said rib portions of said mold.

26. A method for forming a large ribbed structure to a uniform thickness as recited in claim 25 wherein said distributing step comprises the further step of providing extensions of said ribbed portions of said mold for channeling the resin to areas between adjacent rib portions of the structure.

27. A method for forming a large ribbed structure to a uniform thickness as recited in claim 25 comprising the further step of providing dams in said openings among said rib portions of said mold thereby to form corresponding dams in the openings among said rib portions of the large ribbed structure to prevent transverse flow of flushing fluids for said large structure from one inter-rib channel to another inter-rib channel.

28. A plastic flush tray having a substantially horizontal interior portion, said interior portion having:
a drain opening;
a plurality of rib portions projecting upwardly from the horizontal interior portion for channeling flushing fluids to said drain opening; and
wherein said tray is a large article of manufacture, formed from a plastic material by a rotational molding process utilizing a mold, said tray having a substantially uniform plastic thickness formed during said rotational molding process by providing a uniform distribution of plastic throughout the mold, said rib portions separated by openings formed by openings in said mold for permitting plastic material to flow therethrough during said rotational molding process, thereby to provide said uniform distribution of plastic throughout the mold and to provide said uniform plastic thickness prior to solidification of the plastic.

29. A flush tray as recited in claim 28 wherein said interior portion is sloped downwardly towards said drain opening further to channel the fluids to the opening.

30. A plastic flush tray having a substantially horizontal interior portion, said interior portion having:

a drain opening;

a plurality of rib portions projecting upwardly from the horizontal interior portion for channeling flushing fluids to said drain opening; and wherein said tray is a large article of manufacture, formed from a plastic material by a rotational molding process utilizing a mold, said tray haivng a substantially uniform plastic thickness thereof, formed during said rotational molding process by providing a uniform distribution of plastic throughout the mold, said rib portions spaced apart from each other for permitting plastic material to flow therethrough during said rotational molding process, thereby to provide said uniform distribution of plastic throughout the mold and to provide said uniform plastic thickness prior to solidification of the plastic.

31. A flush tray as recited in claim 30 wherein said mold includes a plurality of ribs and a rib-free region for forming said rib portions of said tray and for forming a rib free portion in said tray.

* * * * *